United States Patent [19]

Bader et al.

[11] Patent Number: 5,384,379
[45] Date of Patent: Jan. 24, 1995

[54] SULFUR-CONTAINING POLY(METH)ACRYLATE

[75] Inventors: Martina Bader, Griesheim; Patrik Hartmann, Buettelborn; Gerhard Schwinn, Dieburg, all of Germany

[73] Assignee: Roehm GmbH Chemische Fabrik Patentabteilung, Darmstadt, Germany

[21] Appl. No.: 134,737

[22] Filed: Oct. 12, 1993

[30] Foreign Application Priority Data

Oct. 10, 1992 [DE] Germany .............................. 4234251

[51] Int. Cl.⁶ .............................................. C08F 12/30
[52] U.S. Cl. ...................................... 526/286; 526/289
[58] Field of Search .................................. 526/286, 289

[56] References Cited

U.S. PATENT DOCUMENTS 5,247,041 9/1993 Iguchi et al. ........................ 526/289

FOREIGN PATENT DOCUMENTS 273710 7/1988 European Pat. Off. ............ 526/286

*Primary Examiner*—Melvyn I. Marquis
*Assistant Examiner*—Mark D. Sweet
*Attorney, Agent, or Firm*—Oblon, Spivak, McClelland, Maier & Neustadt

[57] ABSTRACT

The invention relates to sulfur-containing polymethacrylates P produced by radical polymerization of monomers of formula I:

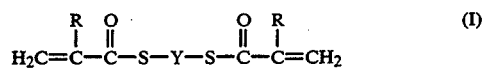

where

Y represents a $C_{2-12}$ alkyl group, a $C_{2-12}$ branched alkyl group, a $C_{3-12}$ cyclic alkyl group, a $C_{6-14}$ aryl group, or a $C_{7-26}$ alkaryl group, wherein the carbon chains of Y may be interrupted by one or more ether or thioether groups; and R represents hydrogen or methyl; and wherewith the polymer P contains, in addition to units of monomer(s) of formula I, units of at least one monomer of formula II:

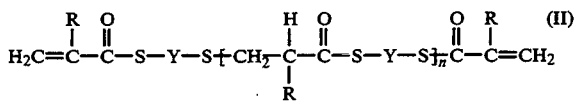

where R and Y have the same meanings as above; and n is an integer in the range 1 to 6.

3 Claims, No Drawings

SULFUR-CONTAINING POLY(METH)ACRYLATE

FIELD OF THE INVENTION

The invention relates to a sulfur-containing polyacrylate and polymethacrylate, for optical applications.

DISCUSSION OF THE BACKGROUND

Sulfur-containing polymers are promising materials for optical applications. When the sulfur content is sufficiently high, polymers with a high index of refraction and low light-dispersion are obtained.

Esters of thio(meth)acrylic acid are particularly important as component units of polymers because they have a relatively high sulfur content. The poly(meth)acrylic acid esters of polythiols as described in EP-273,661 and EP-394,495, are suitable monomers for producing optical materials (see EP-273,710). Optical applications require high uniformity and purity of the starting materials. Heretofore, the preferred method of removing impurities and by-products has been to distill the monomers, which leads to a decreased yield due to partial polymerization, decomposition, etc.; this is particularly true in the case of high boiling compounds.

Because of the risk of thermally induced polymerization, as a result of the high boiling point, it has been found to be impracticable to purify higher polythio(meth) acrylates by distillation.

(Meth)acrylic acid esters of thioether alcohols have also been described (e.g. DE-A 38 38 350). However, neither these nor the vinyl compounds (claimed in EP-284,374) produced by Michael addition of multifunctional mercaptans to multiply unsaturated compounds provides a sufficient sulfur content. As a result, the index of refraction is too low, even though the optical dispersion is low, as desired.

Accordingly, there is a persistent need for transparent plastics with a high index of refraction, preferably plastics which are readily available or easy to produce industrially.

According to the method described hereinbelow, which comprises the principal claimed matter of the contemporaneous DE-P 42 34 257.0, starting with (meth)acrylic acid anhydride one can produce thio(meth)acrylic acid esters having sufficient purity for all customary applications. In the method, the (meth)acrylic acid anhydride, preferably dissolved in an inert water-immiscible solvent, is reacted with an optionally substituted $C_{1-24}$ alkyl- or $C_{6-24}$ arylthiol atoms, preferably in an aqueous alkaline medium. When the described method is employed with polythiols, a thioether polythio(meth)acrylate is produced as a byproduct in substantial proportions. Such a byproduct is also produced when (meth)acrylic acid chloride is reacted with polythiols.

The typical practice of one skilled in the art in comparable cases, is to separate the reaction products, the undesired byproducts (in this case the thioether polythio(meth)acrylates), and the auxiliary agents being tried; such separations may be, e.g., by means of distillation or with the aid of chromatography. However, as one could readily predict, industrial implementation of these techniques is impeded by the fact that distillation to separate these compounds is complex, costly and yield-lowering, and chromatography is complex and costly.

It has been discovered that, surprisingly, the polymer produced from the mixture of the unrefined products of the manufacturing process of synthesizing the thio(meth)acrylic acid ester has better characteristics for some applications than do the corresponding polymers from the purified monomers. Thus, poly(ethanedithiol dimethacrylate) has much poorer mechanical properties than the copolymer produced from the unrefined monomer mixture which is generated in the manufacturing process.

SUMMARY OF THE INVENTION

Accordingly, the present invention relates to a sulfur-containing poly(meth)acrylate P produced by radical polymerization of i) components comprising at least one monomer of formula I:

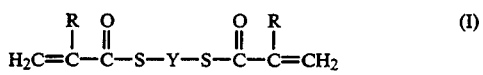

where

Y represents a $C_{2-12}$ alkyl group, a $C_{2-12}$ branched alkyl group, a $C_{3-12}$ cyclic alkyl group, a $C_{6-14}$ aryl group, or a $C_{7-26}$ alkaryl group, wherein the carbon chains of Y may be interrupted by one or more ether or thioether groups; and R represents hydrogen or methyl; and ii) components comprising at least one monomer of formula II:

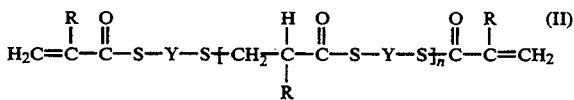

where R and Y have the same meanings as above; and n is an integer in the range 1 to 6.

In general, the molar ratio of the monomers of formulas I and II is in the range 1: 0.5 to 0.5: 1, preferably 1.05–1.2:1; however, deviating molar ratios such as 1:0.2 are tolerable.

In particular the present invention relates to sulfur-containing polymethacrylates P produced by radical polymerization of the products V of the reaction of iii) at least two moles of a compound of formula III

where X represents chlorine or

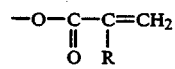

and R represents hydrogen or methyl; with iv) one mole of a polythiol of formula IV

where Y has the same meaning as above; and

M and M' each independently represent hydrogen or a metal cation, particularly an alkali cation such as sodium or potassium; wherein said radical polymerization is carried out after removal of the components which do not take part in the reaction of (III) with (IV) (i.e. essentially removal of the solvent b and the aqueous phase).

DETAILED DESCRIPTION OF THE PREFERRED EMBODIMENTS

Preferably, the compound of formula (III) is (meth)acrylic acid anhydride. In the reaction, an anion X is liberated which, if M represents hydrogen, is converted to a neutral salt by the base addition.

Advantageously, the method leading to the product V is carried out by dissolving the compound of formula III in an inert organic solvent L, which is preferably water-immiscible, and, in the presence of one or more polymerization inhibitors IH, such as sterically hindered phenols such as 4-methyl-2,6-di-tertbutylphenol, 2,4-dimethyl-6-t-butylphenol, or t-butylpyrocatechol; or quinone compounds such as hydroquinone monomethyl ether, etc. (which are per se known) in amounts of 0.01–1.0 wt. % based on the amount of III, followed by adding dropwise to this solution, preferably with stirring and cooling (preferably by ice), an aqueous solution of the polythiol of formula IV in a base, preferably an aqueous alkali such as NaOH or KOH. Advantageously, a slight molar excess of the starting compound of formula III is used, e.g. a molar ratio of 2.05–2.2: 1 of III: IV. As a rule the pH is maintained in the range 7–10. The reaction may be carried out, e.g., with the aid of a phase transfer catalyst (see Webster, O. W. et al., *J. Am. Chem. Soc.*, 105, 5706).

The mixture may be allowed to react for a certain time period after completion of the addition of polythiol, e.g. 3 hr, at temperatures above room temperature, e.g. 40° C. Advantageously, the organic phase is separated out and washed with water and/or an aqueous alkali solution (pH c. 12). Then the solvent L is removed, preferably by vacuum distillation, e.g. on a rotary evaporator.

The product V which remains may be used without purification in the polymerization, as mentioned above.

In general, the product V is a colorless mixture of monomers, containing as components the compounds of formulas I and II (n=1, 2, 3, etc.). The compound of formula II where n=1 may also be determined by gas chromatography. The higher adducts may be determined by thin layer chromatography and may be separated by column chromatography.

Examples of inert organic solvents L which may be used are ethers, e.g. methyl t-butyl ether (MTBE), and aromatic solvents, such as toluene and xylene.

Particular non limiting examples for use as compounds of formula IV are 1,2-ethanedithiol, 1,3-propanedithiol, 1,4-butanedithiol, 1,6-n-hexanedithiol, and 1,6-cyclohexanedithiol.

The invention also relates to the polymerization method which leads to the sulfur-containing polymethacrylate P.

According to the inventive method, the monomers of formula I together with the monomers of formula II are polymerized in a mixture or in a common solvent LG, with the addition of one or more radical initiators, at elevated temperature.

Examples of common solvents LG which may be used are ethers, e.g. methyl t-butyl ether (MTBE), and aromatic solvents, such as toluene and xylene.

In a simple version of the method, the polymerization of the two components (I, II) may be carried out without the addition of a solvent, after addition and mixing-in of the initiator, in a closed vessel which preferably may be an ampule which is sealed in a vacuum. Preferably the polymerization is carried out at an initial elevated temperature (e.g. in a water bath), with further gradual or stepwise increases in temperature over an extended time period. A suggested temperature schedule is a rise from 40° C. to 90° C. over a period of c. 26 hr.

The radical initiators used may be initiators which are per se known, e.g. azo initiators such as azobis-(isobutyronitrile), in the customary concentrations, e.g. 0.1–1 wt. % (based on the weight of the monomers) (see Rauch-Puntigam, H., and Voelker, Th., 1968, "Acryl- und Methacrylverbindungen", pub. Springer-Verlag).

Suitable known additives may be added to the polymer P; such as UV absorbers, antioxidants, and optionally colorants (see Gaechter, and Mueller, H., 1979, "Taschenbuch der Kunststoff-Additive" pub Hanser-Verlag).

The sulfur-containing polymer P obtained is colorless, hard, and brittle.

ADVANTAGEOUS PROPERTIES AND APPLICATIONS

The advantages of the method of manufacturing the inventive polymer P are clear. One may dispense with the costly purification of the starting products of type I, which purification is sometimes accompanied by substantial losses of material. The optical and other properties of the polymer P are equal to or superior to those of the homopolymers of the monomers of formula I. The transparency, heat resistance, and processibility (particularly with sawing and machining tools) tend to be especially good. The polymer P may be used in the areas of optics, particularly as optical materials such as glazing, lenses, optical components, etc.

Having generally described this invention, a further understanding can be obtained by reference to certain specific examples which are provided herein for purposes of illustration only and are not intended to be limiting unless otherwise specified. In the Examples, the index of refraction and the Abbe number are obtained with the aid of an Abbe refractometer. The Abbe number can be determined with the aid of dispersion tables (see DIN 53 491; 1978 "Ullmanns Encyclopaedie der technischen Chemie" 4th Ed., Vol. 15, pub. Verlag Chemie, p. 368).

EXAMPLES

Example A: Producing the Starting Product (Product V) Comprising Compounds of Formulas I and II:

General Method

The compound of formula III, preferably an anhydride, stabilized with c. 1,000 ppm 4-methyl-2,6-di-t-butylphenol per mol, in a molar excess of a factor of 1.05–1.2, in MTBE in approximately twice the amount (by wt.), is charged to a reaction vessel equipped with a stirrer, and a solution of the polythiol of formula IV in 10% sodium hydroxide solution in c. eightfold the amount (by wt.) is added dropwise, with cooling in ice. After completion of the addition, stirring is continued 3 hr at 40° C. The organic phase is then separated out and is washed with water. After drying and solvent removal on a rotary evaporator, the product V is obtained, as a colorless monomer mixture comprised of monomers of formulas I and II, including the adducts with n=1, 2, 3. .. 6. This product V was suitable for use unrefined as a starting material for producing the inventive polymers P. The compounds of formula II where n=1 were determinable by GC.

Using the above-described method, the following products V-1 and V-2 were produced:
Product V-1, starting with 1,2-ethanedithiol, comprising 1,2-ethanedithiol dimethacrylate; and
Product V-2, starting with 1,3-propanedithiol, comprising 1,3-propanedithiol dimethacrylate.

Example B: Polymerization of Product V to Polymers P

General Method 0.4 wt. % of 2,2-azobis(isobutyronitrile) is added to 10 ml product V from Example A, and is polymerized in an ampule (which ampule may advantageously be sealed in a vacuum), in a water bath, with the bath temperature being gradually (or stepwise) increased from 40° C. to 90° C. over a period of 26 hr.

Product V-1 (starting with 1,2-ethanedithiol) gave a colorless, hard, brittle material P-1 having index of refraction 1.6079 and Abbe number 35.

Product V-2 (starting with 1,3-propanedithiol dimethacrylate) gave a clear, hard polymer with index of refraction 1.6020 and Abbe number 38.

Example C (Comparison Example): Production and Polymerization of Pure Ethanedithiol Dimethacrylate A solution of 47.1 g ethanedithiol and 140 mL triethylamine was added dropwise to a solution of 104.5 g methacrylic acid chloride in 1 L toluene, over a period of 2 hr, while maintaining a temperature of c. 20° C. in the reaction mixture. After completion of the dropwise addition, stirring was continued for an additional 3 hr, at room temperature. The salt which formed was filtered out. After removal of the solvent on a rotary evaporator, vacuum distillation was carried out. 31.1 g ethanedithiol dimethacrylate was obtained (27% of theoretical; boiling point 123°–126° C. at 0.07–0.1 mbar).

10 mL of this purified product was polymerized according to the reaction conditions in Example B. The result was a clear, hard polymer which was very brittle and contained numerous cracks, so that it could not be processed with mechanical operations (e.g. sawing).

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A sulfur-containing poly(meth)acrylate comprising the radical polymerization product of
   i) monomers of formula I:

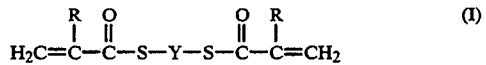

where
Y represents a $C_{2-12}$ alkyl group, a $C_{2-12}$ branched alkyl group, a $C_{3-12}$ cyclic alkyl group, a $C_{6-14}$ aryl group, or a $C_{7-26}$ alkaryl group, wherein the carbon chains of Y may be interrupted by one or more ether or thioether groups; and
R represents hydrogen or methyl; and
ii) units of at least one monomer of formula II:

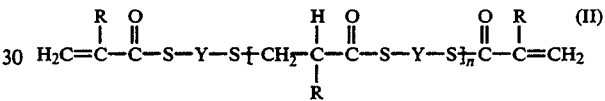

where R and Y have the same meanings as above; and n is an integer in the range 1 to 6.

2. The sulfur-containing poly(meth)acrylate of claim 1, wherein monomers of formula I and II are reacted in a molar ratio of from 1:0.5 to 0.5:1.

3. A shaped article comprising the sulfur-containing poly(meth)acrylate of claim 1.

* * * * *